United States Patent

Kolb et al.

[11] Patent Number: 6,028,923
[45] Date of Patent: Feb. 22, 2000

[54] TELECOMMUNICATIONS ENHANCEMENT USER INTERFACE SYSTEM AND METHOD

[75] Inventors: Charles A. Kolb, Cuba; Irvin Davis, Ladue; Daniel Ciardullo, Rolla, all of Mo.

[73] Assignee: Call Director, Inc., Cuba, Mo.

[21] Appl. No.: 09/011,088

[22] PCT Filed: Jul. 15, 1996

[86] PCT No.: PCT/US96/11710

§ 371 Date: Jan. 8, 1998

§ 102(e) Date: Jan. 8, 1998

[87] PCT Pub. No.: WO97/03514

PCT Pub. Date: Jan. 30, 1997

[51] Int. Cl.[7] .............................. H04M 3/42; H04M 1/00
[52] U.S. Cl. ..................... 379/216; 379/354; 379/355; 379/356; 379/142; 379/93.17
[58] Field of Search ................................. 379/216, 355, 379/356, 354, 368, 140, 141, 130, 352, 142, 93.17, 93.23; 455/566, 575, 564

[56] References Cited

U.S. PATENT DOCUMENTS

| | | | |
|---|---|---|---|
| D. 375,310 | 11/1996 | Wooldridge | D14/151 |
| 4,410,765 | 10/1983 | Hestad et al. | 379/112 |
| 4,555,594 | 11/1985 | Friedes et al. | 379/220 |
| 4,565,903 | 1/1986 | Riley | 379/220 |
| 4,685,127 | 8/1987 | Miller et al. | 379/221 |
| 4,751,728 | 6/1988 | Treat | 379/113 |
| 4,791,665 | 12/1988 | Bogart et al. | 379/207 |
| 4,866,763 | 9/1989 | Cooper et al. | 379/221 |
| 4,924,496 | 5/1990 | Figa et al. | 379/142 |
| 5,099,512 | 3/1992 | Shigami et al. | 379/357 |
| 5,119,414 | 6/1992 | Izumi | 379/157 |
| 5,272,748 | 12/1993 | Davis | 379/144 |
| 5,274,693 | 12/1993 | Waldman | 379/355 |
| 5,341,415 | 8/1994 | Baran | 379/201 |
| 5,400,395 | 3/1995 | Berenato | 379/114 |
| 5,509,067 | 4/1996 | Murata | 379/355 |
| 5,761,291 | 6/1998 | Dalton | 379/220 |
| 5,883,942 | 3/1999 | Lim et al. | 379/142 |
| 5,917,904 | 6/1999 | Theis | 379/355 |

*Primary Examiner*—Krista Zele
*Assistant Examiner*—Benny Q. Tieu
*Attorney, Agent, or Firm*—Polster, Lieder, Woodruff & Lucchesi, L.C.

[57] ABSTRACT

A telecommunications interface system is operably coupled to customer premises termination equipment such as a telephone or facsimile machine for controlling signal transmissions to and from a public or private communication network. The interface system can be incorporated into the termination equipment, or can be contained in a housing that is externally connected between the termination equipment and a wall jack providing access to the telecommunications network. The interface system has a memory device for storing data representative of information such as long distance access codes and service providers. Each access code provides access to a long distance service provided by a service provider. A data processing system is provided that performs data processing functions on data stored in the memory device. The interface system also includes a visual display device for displaying information relating to one of the long distance providers based upon data stored in the memory device. Two push-button switches allow a user to change provider information displayed on the display device by scrolling through provider information stored in the memory device. When a desired provider is displayed, the user selects that carrier by pressing a carrier push-button switch. The system then transmits a dial signal indicating the access code for the selected service to the network. Push-button switches are provided that trigger the system to dial preprogrammed area code information stored in the memory device when pressed. Additional push-button switches trigger the system to dial preprogrammed toll free codes also stored in the memory device when pressed.

32 Claims, 5 Drawing Sheets

TELECOMMUNICATIONS ENHANCEMENT USER INTERFACE SYSTEM AND METHOD

RELATED APPLICATION

This application is the National Stage Application of PCT Application Serial No. PCT/US96/11710 filed Jul. 15, 1996.

TECHNICAL FIELD

This invention relates to telecommunications, and more particularly, to a telephone enhancement user interface operatively connected to a telephone station or facsimile machine that allows a user to selectively place a long distance call using one of a plurality of long distance service providers, and to easily dial frequently used long distance prefixes and "800" or "888" toll free numbers.

Dialing a long distance call often requires dialing a myriad of numbers for prefixes and codes before actually dialing a telephone number to connect the call to a target destination. Telephone companies have indicated that with the proliferation of cellular telephones, facsimile machines and computer modem usage, the problem is only going to get worse. Additional area codes recently have been assigned by many regional telecommunications companies, and "888" toll free services are being introduced since the supply of available "800" toll free numbers is nearly exhausted.

Furthermore, the Telecommunications Act that was recently enacted in the United States has opened the floodgates for competition among long distance service providers. The Act also permits long distance service providers to enter the local service market. Various long distance providers offer attractive packages to attract subscribers, such as reduced peak and off-peak rates, lower weekend rates, fixed rates at all times for international calls, etc. While a customer must "sign up" with one long distance carrier to be able to make all types of long distance calls, it is not necessary to use the long distance services provided by that carrier for all long distance calls. As a customer, it is often more economically advantageous to use one long distance provider for certain calls (e.g., national calls during peak hours), and one or more additional providers for other types of calls (e.g., international calls and national calls during off-peak hours). However, because of the confusion associated with remembering various access codes to place calls with different long distance telecommunications companies, many individuals subscribe to and use only one long distance service to place all long distance calls, thus failing to take advantage of more reasonable rates that may be offered by other providers. Furthermore, often subscribers to reduced-price telecommunications services do not utilize the service because of the many numbers that must be dialed to access the service.

BACKGROUND ART

Accordingly, one object of the present invention is to provide a new and improved telecommunications enhancement user interface system and method that is operatively connected to customer premises termination equipment such as a conventional telephone set or facsimile machine to control certain dialing functions otherwise performed by the termination equipment.

Another object of this invention is to provide a telecommunications enhancement user interface system and method that allows for transmission of a dial signal indicating area code information (e.g., 1314) used to place a long distance call by simply pressing one push-button switch.

Another object of this invention is to provide a telecommunications enhancement user interface system and method that allows a user to modify or create area code information.

Another object of this invention is to provide a telecommunications enhancement user interface system and method that allows for quick and easy dialing of toll-free prefix codes (e.g., 1800 or 1888) by simply pressing a push-button.

Another object of this invention is to provide a telecommunications enhancement user interface system and method that allows a user to select a long distance telecommunications provider from a preprogrammed group of available providers, and then place a long distance call using the selected provider's service.

Another object of this invention is to provide a telecommunications enhancement user interface system and method that allows a user to update or modify information relating to long distance telecommunications providers.

Another object of this invention is to provide a telecommunications enhancement user interface system and method that satisfies FCC testing requirements.

Still another object of this invention is to provide a telecommunications enhancement user interface system and method that allows for transmission of a dial signal indicating prepaid calling card information by simply pressing a push-button switch.

Another object of this invention is to provide a telecommunications enhancement user interface system and method contained in a housing that is externally connected to termination equipment during operation of the invention, wherein the housing can be transported from one location (e.g., the office) to another location (e.g., a hotel room) for connection to different termination equipment without erasing preprogrammed area code, toll code or long distance provider information.

Yet another object of this invention is to provide a telecommunications enhancement user interface system and method that is incorporated into customer premises termination equipment such as a conventional telephone set or facsimile machine.

These and other objects and advantages will become apparent to those skilled in the art in light of the following disclosure and accompanying drawings.

In accordance with the invention, generally stated, a telecommunications interface system operably coupled to customer premises termination equipment is disclosed for controlling signal transmission to and from a communication network. The interface system includes a memory device having data stored therein representative of a plurality of access codes and a plurality of long distance communication service providers. Each access code provides access to a long distance communication service provided by one of the long distance communication providers. The system also includes a data processing system operably connected to the memory device for performing input, processing, storage, output and control functions on data stored in the memory device. A visual display device is operably connected to the data processing system for displaying data relating to one of the long distance providers stored in the memory device. Means is provided for changing data displayed on the display device to show data relating to another long distance provider stored in the memory device. The system also includes means for selecting a desired long distance communication service based upon presently displayed data on the display device, and means for transmitting a dial signal indicating the access code for the selected long distance communication service to the communication network.

Another aspect of the present invention is of a telecommunications interface system used in conjunction with a conventional touch tone telephone set for controlling signal transmissions between the telephone and a telecommunications network. The interface system includes a memory device for storing data including name information identifying one or more long distance telecommunications service providers, access code information for accessing a long distance telecommunications service provided by each of the long distance providers, and area code information representative of one or more area codes. A data processing device is operably connected to the memory device for performing data processing functions on data stored in the memory device, and for controlling the operation of the interface system. The data processing device monitors signals received from the telephone set indicating whether the telephone set is maintained in an off-hook or on-hook condition. The system also includes a visual display device operably connected to the data processing system for displaying information based upon data stored in the memory device. A power source is provided for supplying power to the interface system. A ringing detector circuit is operatively connected between the data processing device and the telecommunications network for monitoring signals received from the telecommunications network to determine whether a ringing signal indicative of an incoming call is present, and transmitting a message signal to the data processing device indicating when a ringing signal is received. The interface system also includes a switching circuit operatively connected to the data processing device, the telecommunications network and the telephone set for routing and processing signals transmitted to and from the telecommunications network and the telephone set. The data processing device controls the operation of the switching circuit when the interface system is energized by the power source. A dual tone multifrequency circuit is included that is operatively connected between the microprocessor and the switching circuit for converting signals transmitted from the microprocessor to the telecommunications network into a format readable by the telecommunications network. The system also has one or more manually actuated area code push-button switches operatively connected to the data processing device. The number of area code switches is at least equal to the number of area codes stored in the memory device. Each switch triggers the data processing device to retrieve information relating to a corresponding area code when actuated. The data processing device then transmits a dial signal to the telecommunications network representative of the area code information associated with the actuated switch. Means is provided for changing presently displayed information on the display device to show name information relating to a different long distance provider stored in the memory device. Means is further provided for selecting a desired long distance communication service based upon presently displayed name information on the display device. The system includes a manually actuated carrier push-button switch operatively connected to the data processing device for triggering the data processing device to transmit a dial signal to the telecommunications network representative of the access code for the selected long distance communication service upon actuation of the carrier switch.

Yet another aspect of the present invention is that of a method for transmitting a long distance call using a telecommunications interface system operably connected to customer premises termination equipment to remote termination equipment via a communication line associated with a telecommunication network, comprising the steps of:

inputting data into a memory device relating to a plurality of long distance communication service providers in a memory device, including an access code used to access a long distance communication services provided by each long distance provider, and a name identifying each long distance provider;

storing the data in the memory device;

displaying information associated with a particular long distance provider stored in the memory device on a visual display device;

selectively changing information shown on the display device to information relating to a different long distance provider;

selecting a desired long distance provider based upon the information presently displayed on the display device;

transmitting a first dial signal across the communication line representative of the access code stored in the memory device used to access the long distance service provided by the selected long distance provider;

transmitting a second dial signal across the communication line representative of an area code designating a geographical area including the remote termination equipment; and transmitting a third dial signal across the communication line representative of an extension number assigned to the remote termination equipment.

Other objects and features will be apparent and in part pointed out hereinafter.

BRIEF DESCRIPTION OF DRAWINGS

The objects of the invention are achieved as set forth in the illustrative embodiments shown in the drawings which form a part of the specification.

Corresponding reference characters indicate corresponding parts throughout the several views of the drawings.

Figure 6A:
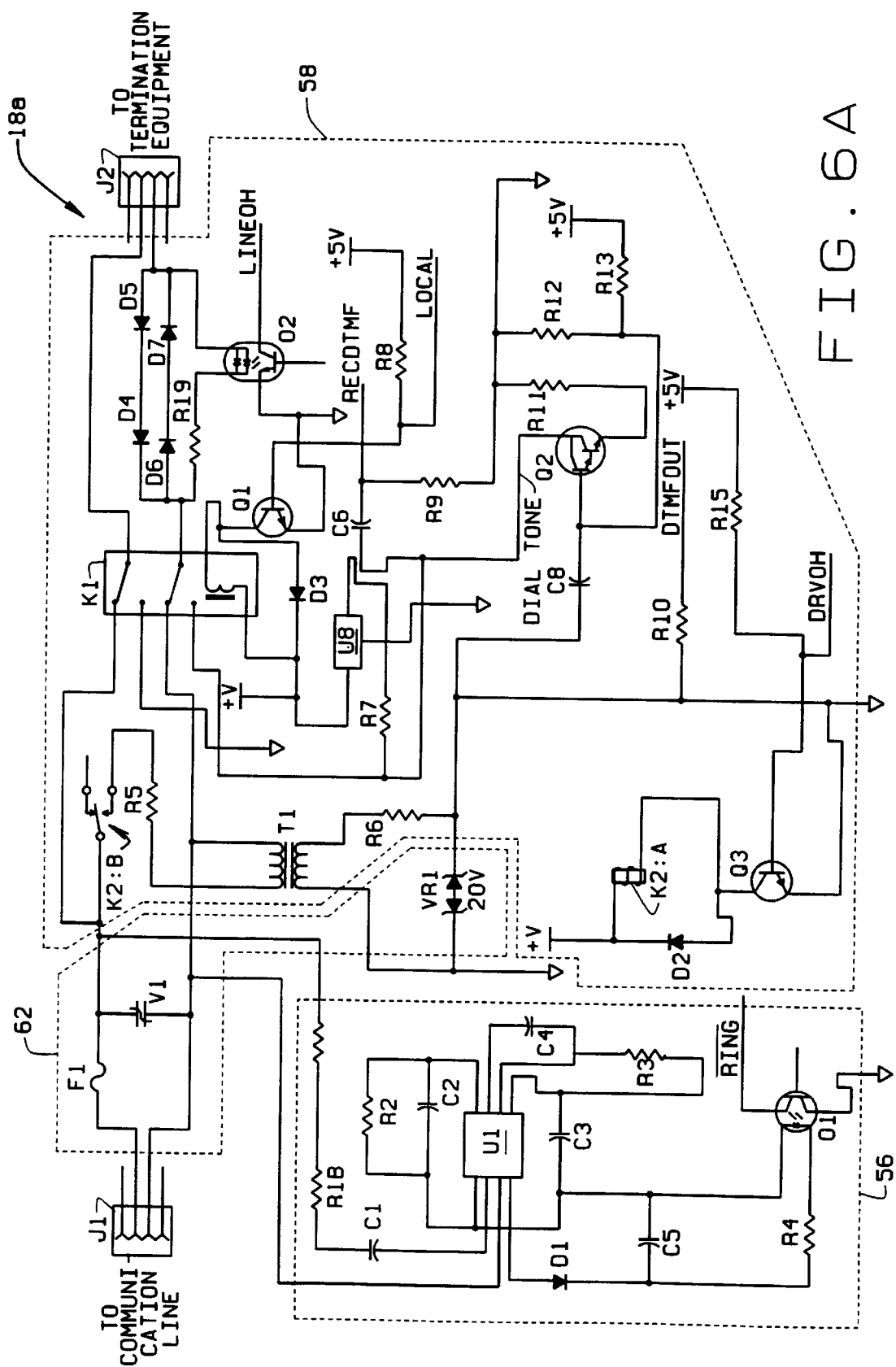
FIGS. 6A and 6B are schematic diagrams of electrical circuitry associated with the externally connected system of the present invention.
Figure 6B:
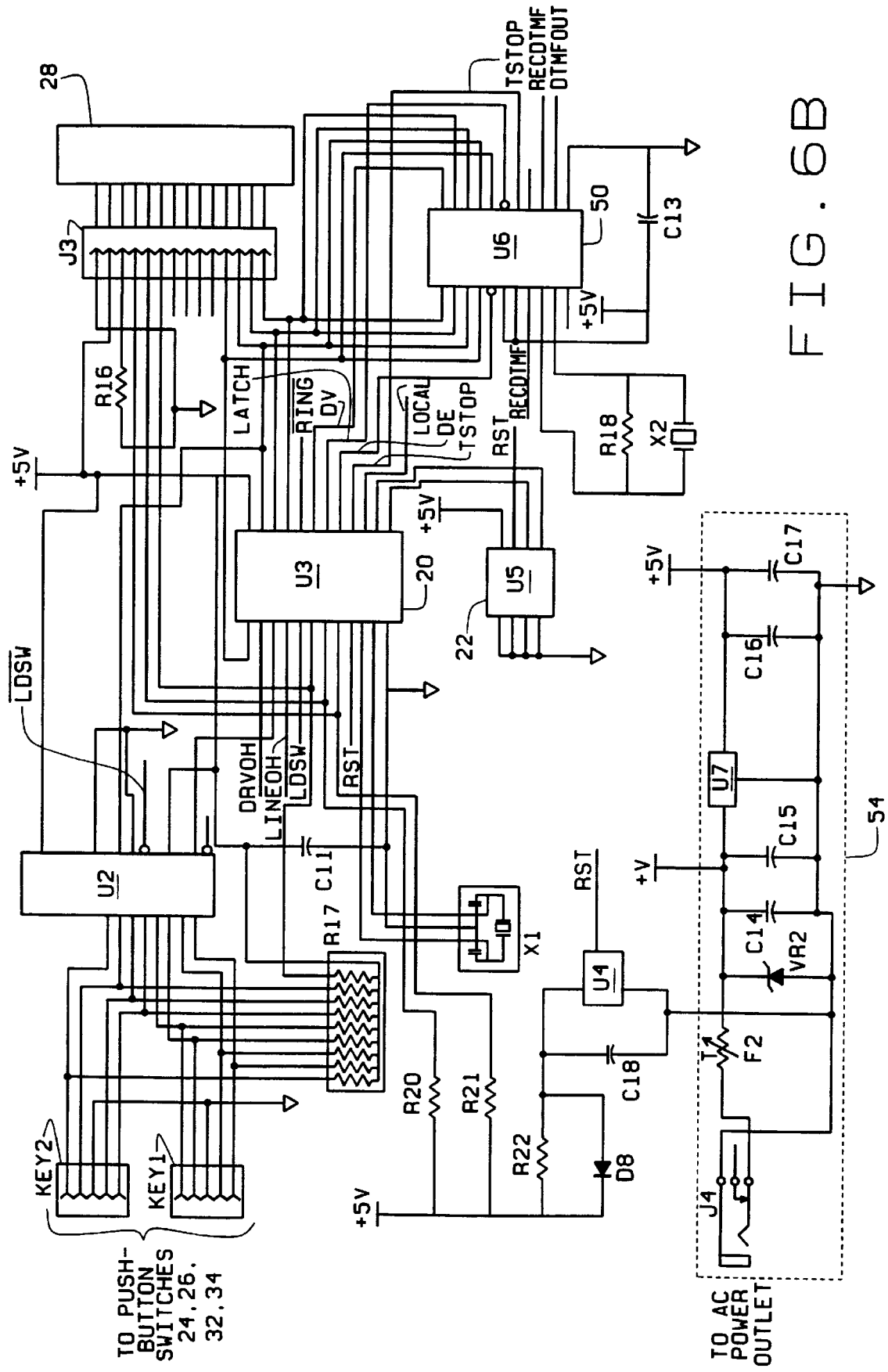

| TABLE OF COMPONENTS IN FIGS. 6A AND 6B | |
|---|---|
| COMPONENT | VALUE/MODEL NUMBER |
| CAPACITORS | |
| C1 | 1 μF |
| C2 | 0.001 μF |
| C3 | 5.0 μF/25 V |
| C4 | 2.0 μF/10 V |
| C5 | 0.1 μF |
| C6 | 0.1 μF |
| C8 | 1 μF |
| C11 | 0.1 μF |
| C13 | 0.1 μF |
| C14 | 10 μF |
| C15 | 0.1 μF |
| C16 | 10 μF |
| C17 | 0.1 μF |
| C18 | 10 μF |
| DIODES | |
| D1 | 1N4148 |
| D2 | 1N4148 |
| D3 | 1N4148 |
| D4, D5, D6, D7 | 1N400X |
| D8 | 1N4148 |
| FUSES | |
| F1 | .3 |
| F2 | RXE017 |
| JUMPERS | |
| J1 | RJ-11J |
| J2 | RJ-11J |
| CONNECTORS | |
| KEY 1 | 5 PIN |
| KEY 2 | 5 PIN |
| OPTOISOLATORS | |
| O1 | 4N35N |
| O2 | H11AA1P |
| TRANSISTORS | |
| Q1 | 2N2222A |
| Q2 | MPSA12 |
| Q3 | 2N2222A |
| RESISTORS | |
| R1A | 3.3 KΩ |
| R1B | 3.3 KΩ |
| R2 | 180 KΩ |
| R3 | 1.8 KΩ |
| R4 | 1 KΩ |
| R5 | 100 Ω |
| R6 | 100 Ω |
| R7 | 220 Ω |
| R8 | 2.2 KΩ |
| R9 | 100 KΩ |
| R10 | 1 KΩ |
| R11 | 220 Ω |
| R12 | 100 KΩ |
| R13 | 100 KΩ |
| R15 | 2.2 KΩ |
| R16 | 6.8 KΩ |
| R17 | 10 KΩ resistance bay |
| R18 | 1 MΩ |
| R20 | 10 KΩ |
| R21 | 10 KΩ |
| R22 | 10 KΩ |
| INTEGRATED CIRCUITS | |
| U1 | MC34012 |
| U2 | 74HC165 |
| U3 | 87C750 |
| U4 | MN13812-S |
| U5 | 24LCXX |
| U6 | 75T2090 |

-continued

| TABLE OF COMPONENTS IN FIGS. 6A AND 6B | |
|---|---|
| COMPONENT | VALUE/MODEL NUMBER |
| U7 | LM78L05ACZA |
| U8 | LM7812CTB |
| VARISTOR | |
| V1 | VAL (unknown value)/300 V |
| ZENER DIODES | |
| VR1 | 20 V |
| VR2 | 20 V |
| OSCILLATORS | |
| X1 | 4 MHz |
| X2 | 3.57954 MHz |

BEST MODE FOR CARRYING OUT THE INVENTION

Figure 1:
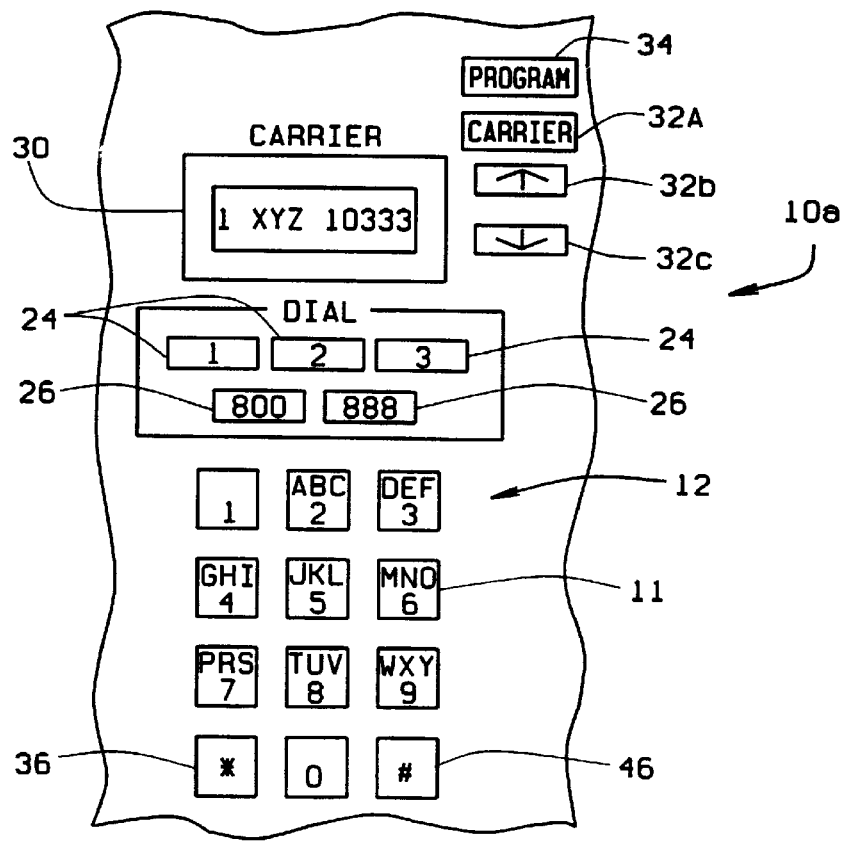
FIG. 1 is a sectional top plan view of a telephone station having the present invention incorporated therein, illustrating one arrangement of the display screen and push-button switches.
Figure 2:
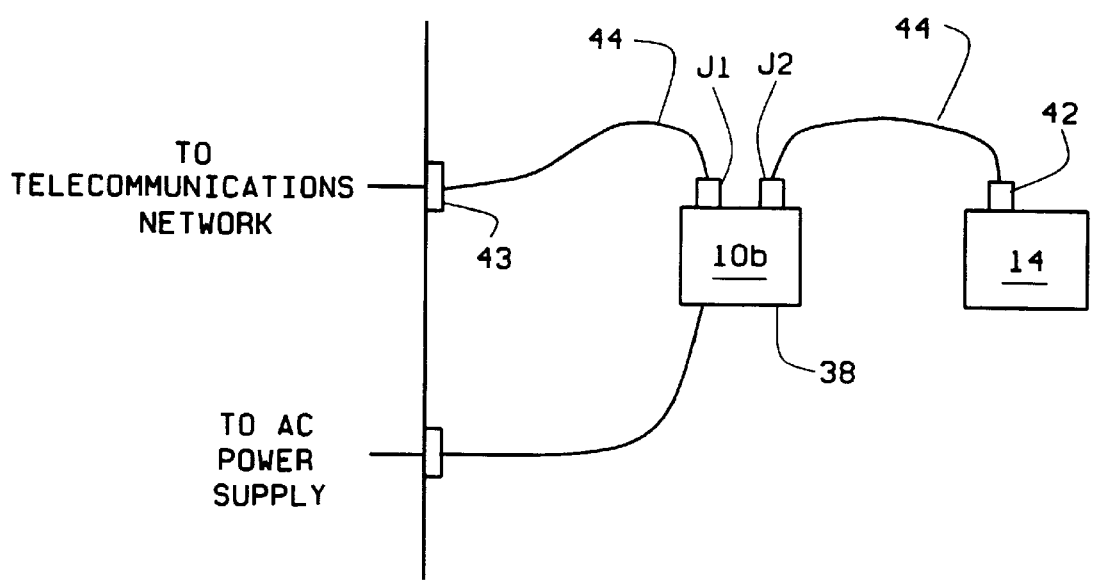
FIG. 2 is a schematic block diagram showing the wiring configuration of an externally connected system of the present invention between customer premises termination equipment and a wall jack.
Figure 3:
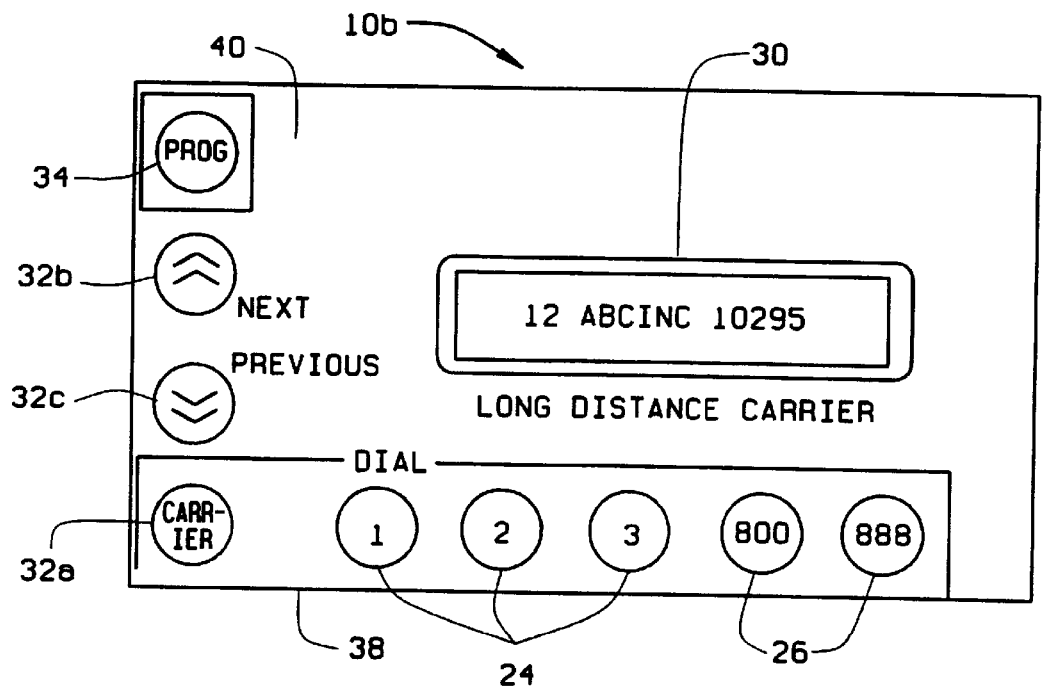
FIG. 3 is a top plan view of the externally connected system, showing one arrangement of the display screen and push-button switches.

Referring now to FIGS. 1–3, a telecommunications enhancement user interface system is shown, indicated generally at 10*a* (FIG. 1) and 10*b* (FIGS. 2 and 3), for providing enhanced telephone operation by reducing the number of push-buttons or keys 11 that a user must push on a dial pad or keypad 12 when dialing long distance numbers from customer premises termination equipment 14 (FIG. 2), such as a telephone, facsimile machine, or other electrical data transmission system that communicates with another similar system disposed at a remote location by dialing an address associated with that remote location to establish a data link via a communication line. The communication line includes the conductors and their supporting or containing structures which are used for public or private signal or communication service. The system 10 allows the user to chose a long distance provider with which to place a call from a group of various long distance providers. Throughout this disclosure, long distance numbers that are in the same area code as the user are referred to as calls within a "local" area code or "local" long distance calls. Long distance numbers placed outside the region serviced by the local (same) area code are referred to as calls to a "foreign" area code or "foreign" long distance calls. In general, long distance numbers include area code information (e.g., 1–214), and a remote extension number (e.g., 213–1000) indicating a particular extension address that is dialed to contact remote termination equipment disposed at a remote location.

As discussed below in greater detail, the telecommunications user interface system of the present invention can be implemented as an internal system 10*a* that is incorporated directly into the customer premises termination equipment 14 (e.g., telephone station or facsimile machine) (FIGS. 1 and 5), or in an external system 10*b* that is contained in a housing connected between a jack or connector 42 associated with the termination equipment 14 and a wall jack or connector 43 providing access to the telecommunications network (FIGS. 2–4, 6A and 6B). The internal system 10*a* and the external system 10*b* are referred to collectively as system 10 throughout the disclosure.

The system 10 includes electrical circuitry 18*a*, 18*b* (FIGS. 4–6B) set forth below having a plurality of electrical components, including a data processing device 20 such as a microprocessor or microcontroller for processing data such as area code information, access code information associated with a plurality of long distance carriers, and switching system information used to access an outside telephone line.

As discussed below, the information is stored in the nonvolatile memory device 22 such as an electrically erasable programmable read only memory device.

The telecommunications user interface system 10 includes at least one area code ("AC") push-button switch 24 that the user can press to dial a preprogrammed area code, such as the local area code, when the termination equipment is off-hook (closed station line). If more than one AC push-button switch 24 is provided, the system is programmed to automatically dial a different predetermined area code when each push-button 24 is pressed. As is known in the art, a push-button switch includes a master switch, mounted behind a cover or panel, and a plunger or button extending forwardly through the opening. Operation of the switch 24 is normally obtained by pressure of a finger against the end of the button. In the preferred embodiments of the internal system 10*a* and the external system 10*b* shown in FIGS. 1 and 3, respectively, three AC push-button switches 24 are employed. However, as will be appreciated by those skilled in the art, the number of AC push-buttons used in either system 10*a* or 10*b* can be increased or decreased easily.

Preferably, the area codes associated with each push-button switch 24 represent those area codes that are frequently dialed by the user. For example, when the termination equipment 14 is off-hook, the system 10*b* shown in FIG. 3 can be programmed to dial "1202" when the first AC push-button switch 24 designated as "1" is pressed, to dial "1303" when the second AC push-button switch 24 designated as "2" is pressed, and to dial "1404" when the third AC push-button switch 24 designated as "3" is pressed. In this hypothetical example, one area code preferably represents the local area code, and the other two area codes represent frequently dialed foreign area codes. After the prefix "1" and the three digit area code are dialed by the system 10, the user then manually dials the remaining numbers in a conventional fashion using the keypad 12 associated with the termination equipment 14 to contact a desired remote extension. This enhancement feature saves the user from having to push "1" plus the local or foreign area code on the keypad 12 associated with the termination equipment 14 for frequently dialed numbers. The preprogrammed information can include up to 16 digits or characters, representative of information such as the area code, PBX codes used to obtain a telephone line, or the like.

Additional enhancement features associated with the system 10 include at least one toll free push-button switch 26 that automatically dials a toll free prefix codes such as "1800" or "1888" when pressed by the user and the termination equipment 14 is off-hook. In the preferred embodiment, two toll free push-button switches 26 are used, with one push-button 26 triggering the system to dial the code "1800" when pressed, and the other push-button 26 triggering the system to dial the code "1888" when pressed. After the toll free code is dialed, the user can dial the remaining numbers manually using the keypad 12.

The system 10 also allows the user to select a long distance carrier from a group of such providers, and dials the necessary access code information to place a long distance call using the selected carrier. To accomplish this function, the system 10 includes an alphanumeric visual display device 28 such as an LCD (liquid crystal display) device that displays one carrier name at a time on an associated display screen 30, and three push-button switches 32 that allow the user to select a desired carrier (FIGS. 1,3). These three push-buttons 32 are referred to as a "carrier" push-button switch 32*a*, a "next" or "scroll up" push-button switch 32*b*, and a "previous" or "scroll down" push-button switch 32*c*.

The previous and next push-buttons 32*b*, 32*c* and display 28 allow the user to scroll through each of the preprogrammed long distance carrier names displayed on the display screen 30 by selectively advancing to the next name or previous name by pressing the next or previous push-button, respectively. One carrier name is displayed on the screen 30 at a time, with each name having up to eight characters in the preferred embodiment. To the left of the carrier name when looking at the display screen 30 is a number having the value of 0 through n where n refers to the maximum number of carriers that can be stored in the memory device 22. In the preferred embodiment, information relating to up to 18 different carriers can be stored in the memory device 22. As will be appreciated by those skilled in the art, the number of carriers easily can be increased based upon the type of memory device 22 used. If no carrier name is programmed for a particular carrier number, the display screen 30 is blank where the carrier name would otherwise be displayed, and only the number is displayed. The carrier numbers are displayed in sequential order based upon the scrolling push-button key 32*b*, 32*c* pressed by the user. Pressing the "next" key 32*b* causes information displayed on the display screen 32 to change from a lower number carrier to a higher number carrier (e.g., "3 ATT" to "4 MCI"). Pressing the "previous" key 32*c* causes information displayed on the screen 30 to change from a higher number carrier to a lower number carrier (e.g., "4 MCI" to "3 ATT"). Both the next and previous switches 32*b*, 32*c* allow carrier information shown on the display to wrap around such that if the nth carrier is displayed and the next button 32*b* is pressed, the display screen 30 will show the first carrier name. Similarly, pressing the previous button 32*c* when the first carrier name is displayed causes the display screen 30 to change to the nth carrier name.

To choose a long distance carrier, the user places the termination equipment 14 in an off-hook condition (e.g., removes the telephone handset from the base), waits for the tone, and then selects the desired carrier by scrolling through the list of providers. When the desired long distance carrier name and number appears on the display screen 30, the user selects that carrier by pressing the carrier push-button switch 32*a*, thereby triggering the system 10 to dial switching system codes, if any, and the access code for the selected long distance carrier. The long distance carrier is selected by name, thus eliminating the need for the user to memorize various access codes. When the carrier is selected by causing the termination equipment 14 to go off-hook and pressing the carrier push-button 32*a*, the system 10 dials the access code numbers such as "77777-1" where 77777 represents the access code for the desired carrier. The system can be programmed to dial up to 16 digits or characters for each carrier, allowing for access and PBX or other switching system requirements, if needed to access an outside line. The user then manually dials the remaining numbers in a conventional fashion using keys 11 associated with the keypad 12 associated with the termination equipment 14 to contact a desired extension. Alternatively, the user can then press an area code (AC) button 24 to trigger the system 10 to dial one of the preprogrammed area codes after the carrier access information is dialed. In this situation, the user then dials the remaining numbers using the keypad 12.

To determine the carrier access information or area code information stored in the memory device 22 for a particular carrier name or AC button 24 without actually dialing the number, the termination equipment 14 is left on-hook (open station line). To view the information associated with a particular carrier, the scroll buttons 32*b*, 32*c* are used to select the desired carrier. When the desired carrier name is displayed, the carrier button 32a is pressed and the display screen 30 shows as many digits of the switching system information and access code as can be displayed on the screen 30. Similarly, if one of the AC buttons 24 is pressed while the termination equipment 14 is on-hook, the switching system information (if any) and area code associated with that button 24 are displayed to the extent possible based upon the type of display device 28 used. When the AC button 24 is released in this situation, the previously displayed carrier name is redisplayed. Since the termination equipment 14 remains on-hook at all times, no numbers are dialed by the system 10.

The access code for each long distance provider is the same throughout the United States. The telecommunications system 10 of the present invention can be preprogrammed with access codes and carrier names for any number of long distance carriers in a given country or region (e.g., the United States). As discussed above, in the preferred embodiment, up to eighteen long distance providers and their access codes can be stored in the nonvolatile memory device 22 associated with the system 10. As discussed below in detail, to add additional carriers to the group of available long distance providers or modify existing carrier information after the system 10 is in use at the customer premises, a "program" push-button switch 34 is included in the preferred embodiment of the external and internal systems 10a and 10b that activates the system 10 into a programming mode when the push-button 34 is pressed for a period of time. If the program push-button switch 34 is not included, the system 10 can be configured such that the carrier push-button 32a is used to activate the system into the programming mode.

To program the AC push-buttons 24 and the long distance carrier information, the user is required perform a series of programming tasks by manually pressing various push-button switches 24, 26, 32, 34, and keys 11 on the keypad 12 to input and store information into the memory device 22. Programming of the internal system 10a differs from that of the external system 10b in that the termination equipment remains on-hook at all times during the programming of the internal system 10a. In the preferred embodiment of the external unit 10b, all long distance carrier information is input by the user after the external unit 10b is installed between the jack 42 associated with the termination equipment 14 and the wall jack 43 providing access to the telecommunications network.

To start programming of the internal system 10a and the external system 10b, the user presses the program push-button 34 for a period of time (e.g., 5 seconds) while the termination equipment 14 is on-hook. This triggers the microprocessor 20 into a programming mode. The display screen 30 displays a message such as "PROGRAM" indicating the programming mode is initiated. When programming the external system 10b, the user then places the termination equipment 14 in an off-hook condition, but no audible dial tone is emitted from the termination equipment 14 in this situation. However, the termination equipment 14 is activated in this situation, and a pulse tone can be heard when a key 11 on the keypad 12 is pressed. When programming the internal system 10a, the termination equipment 14 remains on-hook during the entire programming process.

With the termination equipment 14 in an on-hook state when programming the internal system 10a or an off-hook state when programming the external system 10b, and after the message indicating activation of the programming mode is displayed on the display screen 30, the user presses an "*" key 36 on the keypad 12 to go to the step of programming the information for the area code (AC) buttons 24. When the "*" key 36 is pressed, the display screen 30 shows information such as "LOCAL 1" indicating information can be entered will be dialed when the "1" AC local button 24 is pressed. If desired information is already stored for this button 24 or no information is desired to be input, the user can press a "#" key 46 on the keypad 12 to move to the next step. To program information for the first AC button 24, the user presses the "*" key 36 on the keypad 12. The display screen 30 then shows either a blank screen or numbers which are presently stored in the memory device 22 for that button 24. The "#" key 46 can be pressed at this time to leave the information displayed on the screen 30 unchanged, and move on to the next step.

If the user wants to change the displayed area code information, the appropriate switching information and area code numbers are input as follows. If a number is to be entered, the user presses the appropriate key 11 on the keypad 12 having the corresponding number depicted thereon. The user can include a time delay (e.g., 0.5 seconds) in the dialing sequence by pressing the "*" key 36 associated with the keypad. For example, a user can programming switching system information such as "9**" and then the area code information to provide a time delay or pause before the system dials the area code information, thereby allowing for a PBX system to access an outside line.

The display screen 30 shows each number or character as it is input by the user.

The user can input up to 16 numbers or characters into the nonvolatile memory 22 using the keypad 12, with the numbers and characters being displayed on the screen 30 as they are input by the user. When the data entry for the first AC button 24 is complete, the user presses the "#" key 46 to store this information in the memory device 22, and move on to the next step. If the user enters 16 digits, the system 10a, 10b automatically stores the information in the memory device 22, and moves to the next step.

This process is repeated for each AC push-button 24, where the preferred embodiment includes three AC push-buttons 24. When the screen 30 displays information such as "LOCAL 2" in the preferred embodiment, before entering any additional information, the user can press the "*" key 36 to change the number dialed for the "2" push-button 24, or can press the "#" key 46 to skip to the next step. Otherwise, the user can input the area code information using the same steps as set forth above for the "1" push-button. Similarly, when the display screen 30 then shows information such as "LOCAL 3" indicating programming of the "3" push-button 24 is activated, the user can press the "*" key 36 to change the number dialed for this push-button 24, or can press the "#" key 46 to proceed to the next step.

After the programming of the AC push-buttons 24 is complete, the screen 30 displays information such as "CARRIER 1" indicating the user can now input or modify carrier information for the first carrier stored in the nonvolatile memory 22 of the system 10a, 10b. First, the user can edit or input a long distance carrier name. If the user does not want to change the carrier information for the first carrier, the user presses the "#" key 46 to skip to the next step. The carrier name can include up to 8 alphanumeric characters in the preferred embodiment. To input or change the carrier name, the user presses the "*" key 36 and the display screen 30 shows information such as "NAME?" and the name of the carrier, if any, presently stored as the first carrier.

To enter a number in the carrier name, the user presses an appropriate number key 11 on the keypad 12 one time. To enter a letter, the user selects the key 11 having the letter displayed thereon (e.g., the "2" key has letters A, B and C displayed thereon, as shown in FIG. 1), and presses the key 11 twice for the first displayed letter, three times for the second displayed letter, and four times for the third displayed letter. For example, to input the letter B in the carrier name, the user must press the "2" key three times. The screen 30 displays a number or letter based upon the total number of times the selected key 11 is pressed. For example, if a user wishes to enter a "C" letter in the carrier name, the first time the "2" key is pressed, the screen 30 displays the number "2". The second time the key is pressed, the "2" is replaced with the letter "A" on the screen 30. The third time the "2" key is pressed, the screen 30 shows "B" instead of "A", and then the fourth time the key is pressed, the "B" is replaced with a "C" on the screen 30, as desired. If the "2" key is pressed again (a fifth time), a "2" replaces the "C" and the cycle starts over.

When entering the carrier name, the user presses the "*" key 36 on the keypad 12 to move to the next character in the name. After data entry is complete, the user presses the "#" key 46 on the keypad 12 to save the carrier name in the memory device 22, and to move on to the next step of entering the access code information.

When the carrier name entry is complete and the "#" key 46 is pressed, the display screen 30 shows a message such as "CODE?" indicating the PBX or switching system code (if applicable) and carrier access code for that carrier name can be entered by the user. If carrier access information previously was programmed into this memory 22 location, the display 28 shows this access information (or a portion thereof) on the screen 30 after the message (e.g., "CODE?"). If no access information is stored in the memory 22 for that entry, the display screen 30 is blank after the message. The user can press the "#" key 46 again if the carrier access information displayed on the screen is acceptable and no modification is necessary.

If the user wants to change the existing displayed access information, or input a new access information, the user presses the appropriate keys 11 on the keypad 12 for the switching code (if needed) and the carrier access code. As mentioned above, the "*" key 36 can be used to add a time delay in the dialing sequence. The numbers input by the user overwrite any existing information stored in the memory device 22. In the preferred embodiment, up to 16 numbers or characters can be entered for the switching and access codes. When the switching and access codes are entered, the "#" key 46 is pressed to save the information in the memory device 22 and move on to the next programming step.

After accepting or updating the carrier information, the display 28 automatically prompts the user to verify or modify the next carrier name stored in the memory 22. For example, after completing data entry for the first carrier ("CARRIER 1"), the display screen 30 shows a message such as "CARRIER 2". Data entry for the carrier name, switching code and access code is repeated using the steps set forth above. This process repeats for each carrier position available for the system 10a, 10b (through the nth carrier). As discussed above, data entry for each carrier name or access information can be skipped by pressing the "#" key 46 when appropriate, thereby accepting currently stored information without modification. When data entry for the last carrier (e.g., CARRIER 18 in the preferred embodiment) is complete and the "#" key 46 is pressed, the system automatically exits the programming mode and returns to the normal operating mode.

To better illustrate the foregoing programming steps associated with the external system 10b of the present invention, the following hypothetical example is provided. For this example, the maximum number of long distance carriers supported by the system is two (n=2), and three AC pushbuttons 24 are associated with the external system 10b. Further assume for this example that following parameters are stored in the memory device: (a) the first carrier (CARRIER 1) has a carrier name of "SPRINT" and the associated access code of "10333"; (b) no information is stored in the memory 22 for the second carrier (CARRIER 2); and (c) "1314" is stored as the area code information for the first push-button (LOCAL 1). The following steps illustrate how the user can change the carrier name for CARRIER 1 to "ATT" and the access code to "10288", change the area code information to "1573" for the LOCAL 1 push-button, and add the carrier name of "MCI" for CARRIER 2 along with the access code of "10456".

a) The display initially shows the message "1 SPRINT 10333" before programming begins.
b) Press the PROGRAM key for 5 seconds. This causes the display to show "PROGRAM".
c) Cause the attached termination equipment 14 to go off-hook, and press the "*" key on the keypad. This causes the display screen 30 to show "LOCAL 1".
d) Press the "*" key on the keypad. This causes the display screen 30 to show "1314".
e) Press "1573" on the keypad. This causes the display screen 30 to show "1573".
f) Press the "#" key on the keypad. This causes the display screen 30 to show "LOCAL 2".
g) Press the "#" key on the keypad. This causes the display screen 30 to show "LOCAL 3".
h) Press the "#" key on the keypad. This causes the display screen 30 to show "CARRIER 1".
i) Press the "2" key on the keypad (note in FIG. 1, the "2" key also has the characters "ABC" associated with it). This causes the display screen 30 to show "NAME?2".
j) Press the "2" key on the keypad. This causes the display screen 30 to show "NAME? A".
k) Press the "*" key on the keypad. This causes the display screen 30 to show "NAME? A_".
l) Press the "8" key on the keypad twice. This causes the display screen 30 to show "NAME? AT".
m) Press the "*" key on the keypad. This causes the display screen 30 to show "NAME? AT_".
n) Press the "8" key on the keypad twice. This causes the display screen 30 to show "NAME? ATT".
o) Press the "*" key on the keypad. This causes the display screen 30 to show "NAME? ATT_".
p) Press the "#" key on the keypad. This causes the display screen 30 to show "CODE? 10333".
q) Press "10288" on the keypad. This causes the display screen 30 to show "CODE? 10288".
r) Press the "#" key on the keypad. This causes the display screen 30 to show "CARRIER 2".
s) Press the "*" key on the keypad. This causes the display screen 30 to show "NAME?".
t) Press the "6" key on the keypad twice. This causes the display screen 30 to show "NAME? M".
u) Press the "*" key on the keypad. This causes the display screen 30 to show "NAME? M_".
v) Press the "2" key on the keypad four times. This causes the display screen 30 to show "NAME? MC".
w) Press the "*" key on the keypad. This causes the display screen 30 to show "NAME? MC_".

x) Press the "4" key on the keypad four times. This causes the display screen 30 to show "NAME? MCI".

y) Press the "*" key on the keypad. This causes the display screen 30 to show "NAME? MCI_".

z) Press the "#" key on the keypad. This causes the display screen 30 to show "CODE?".

aa) Press "10456" on the keypad. This causes the display screen 30 to show "CODE? 10456".

bb) Press the "#" key on the keypad. This causes the system 10b to exit the programming mode, and the display screen to show "1 ATT 10288".

Area code information can be programmed in the nonvolatile memory of the system 10 for any carrier position, if desired. For example, using the programming steps outlined above for the internal system 10a or below for the external system 10b, the user can enter "CHICAGO" as the 'carrier name,' and "1708" as area code information (instead of, or in addition to, switching system and access code information) for any carrier position. This allows the user to scroll through various geographic regions by name on the display device 28. When the desired geographic region or area code is displayed, the user triggers the system 10 to dial the area code and switching system information, if any, by pressing the carrier button 32a.

FIG. 1 illustrates the preferred embodiment of the invention having the push-button switches 24, 26, 32, 34 and display device 28 incorporated into the termination equipment 14 as shown in close proximity to the keypad 12. In this embodiment, the electrical circuitry 18 is disposed inside the housing of the termination equipment 14 (e.g., inside a telephone base). Alternatively, the electrical circuitry 18, push-button switches 24, 26, 32, 34 and display device 28 can be disposed in an external housing 38 that is electrically connected between the wall jack 43 providing access to the telecommunications network and the jack 42 associated with the termination equipment 14 as shown in FIG. 2, in a manner similar to the connection of a telephone answering machine. This attachment method allows the system 10b to control the operation of the user's termination equipment 14 as required for various functions. In situations where a telephone answering machine or other device is connected between the termination equipment 14 and the wall jack 43, the external system 10b preferably is connected closest to the termination equipment 14 (e.g., between an answering machine and the telephone station). Both the internal and external systems 10a, 10b satisfy FCC testing requirements.

More specifically, the externally connected enhancement system 10b shown in FIGS. 2 and 3 preferably is contained in a small box housing 38 with the display screen 30 such as a sixteen (16) character LCD display and a plurality of push-button switches 24, 26, 32, 34 disposed on a top panel 40 of the housing 38, and two telephone type (RJ-11) jacks J1 and J2. Jack J1 allows for connection of the external system 10b to the wall jack 43, and jack J2 allows for connection to the jack 42 associated with the termination equipment 14 via wiring 44. FIG. 3 shows a possible top panel 40 design approximately actual size. The dimensions of the housing 38 are preferably 4" in length and 3" in width. The external system 10b preferably is powered by a local ac power supply as shown in FIG. 2. It is also possible to construct an external system 10b that is powered by batteries contained in an easily accessible enclosure inside the external device (not shown). In this configuration, batteries increase the size of the external housing 38 by approximately 1 inch in length or width and approximately 0.75 inch in depth.

The box housing 38 for the external system 10b is constructed from any suitable material such as high quality ABS plastic or other similar material. The housing 38 is designed to be cosmetically appealing, and have a durable construction. The push-button switches 24, 26, 32, 34 have high quality construction with good feel, and are mounted in a manner similar to the mounting of keys on a conventional telephone keypad so as to extend through the top panel 40 of the housing 38. A polycarbonate overlay is printed with the required text and graphics that are attached to the housing 38.

The external connection of the system 10b also allows for transportation of the system 10b and housing 38 from one location to another. For example, the system 10b can be disconnected from a telephone or facsimile machine at one's office, and then reconnected to a telephone or facsimile machine at home or at a hotel room. Information stored in the memory device 22 is retained during transit, and not erased or destroyed when the system 10 is disconnected from the local ac power source.

The external system 10b preferably also includes remote dialing features that allow the user to activate the system 10b to dial the number sequences programmed for the AC push-button switches 24 and the carrier names using only the keypad 12 and without pressing any push-buttons associated with the external system 10b. When the remote dialing features are used, the user triggers the system 10b to automatically dial the digits associated with each AC push-button by pressing the "*" key associated with the keypad 12, followed by a single digit key 11 on the keypad 12, where the key 11 pressed corresponds to the AC push-button 24. For example, in the preferred embodiment shown in FIG. 3, the user can press "*1" on the keypad 12 to trigger dialing of the number sequence associated with the "1" push-button 24, or "*2" to dial the area code information associated with the "2" push-button 24, or "*3" for the "3" push-button 24. This feature allows the user to use the keypad 12 to access information stored in the nonvolatile memory device 22, instead of using the AC switches 24. In the preferred embodiment, area code information corresponding to up to nine AC push-buttons can be access by pressing "*1" through "*9" on the keypad 12. The "0" (zero) key is not used in the preferred embodiment to dial information relating to AC push-buttons 24. As discussed below, the "0" (zero) key 11 is used when dialing access code information using the remote dialing feature.

To select a long distance carrier and trigger dialing of the associated information using the remote dialing feature for the external system 10b, the user can press the "*" key on the keypad, followed by the "0" (zero) key, then two keys 11 corresponding to the carrier number 1–n indicating the desired carrier. The "1" key is pressed to select the first carrier name, and so on up to the nth carrier. As mentioned above, information relating to up to 18 different carriers can be stored in the memory device 22 in the preferred embodiment. The "0" (zero) key on the keypad is pressed to select the tenth carrier name. If carrier number 1-0 is selected, the user must press the "*" key as the second key after entering the single digit carrier number. For example, if XYZ carrier is the fourth carrier entered in the group of carriers stored in the memory device 22, the user would press "*04*" to select the fourth carrier (XYZ) and dial the corresponding access code and switching system information. If carrier number 11-18 in the preferred embodiment is desired, the user is not required to press the "*" key after dialing the carrier number since the microprocessor is programmed to recognize only two characters after "*0" is entered. For example, if ABC carrier is the thirteenth carrier stored in the memory device 22, the user would press "*013" to trigger the system 10b to select and transmit information relating to that carrier. Clearly, the same remote dialing procedures can be used to access carrier information for up to 99 carriers, if the number of carriers stored in the memory device 22 is increased past the 18 carriers of the preferred embodiment. When the remote dialing method is used, the display screen 30 shows the carrier name and corresponding key number selected by the user as the access code and PBX codes are dialed.

The telecommunications system 10 used in the internal and external embodiments also retains information relating to the most recently selected long distance carrier as default information for future calls so that the user does not have to select a long distance carrier each time a long distance call is placed. If no new carrier is selected, the system 10 accesses the provider that was used to place the previous long distance call.

Figure 4:
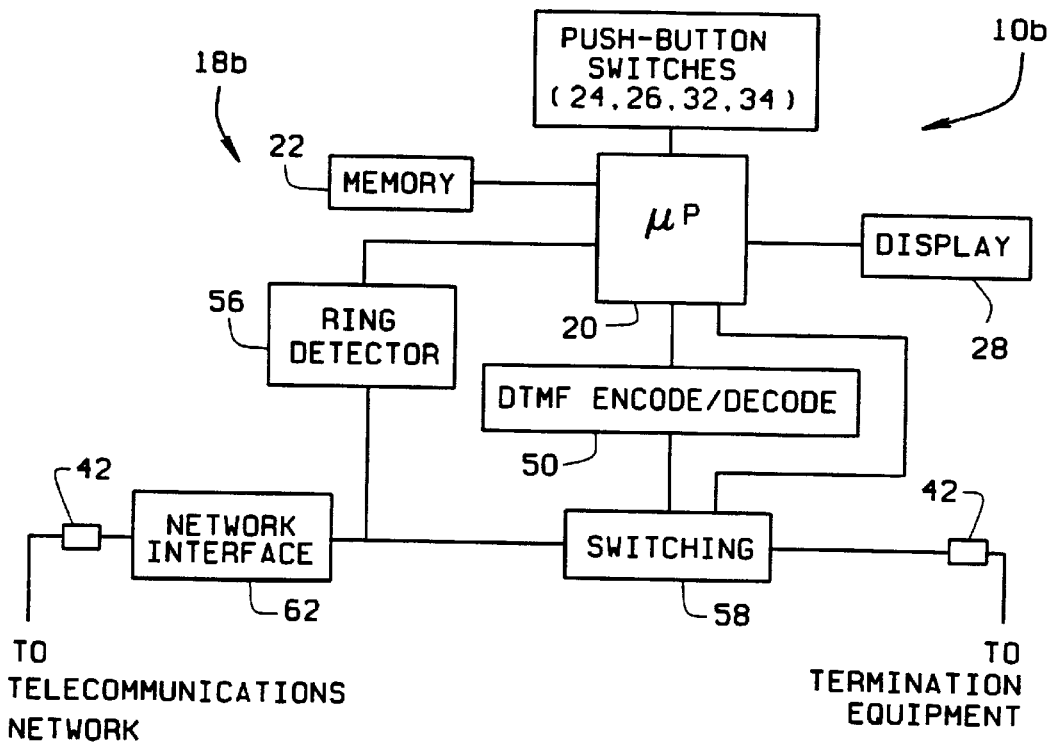
FIG. 4 is a schematic block diagram illustrating the interconnection of electrical components associated with the externally connected system.
Figure 5:
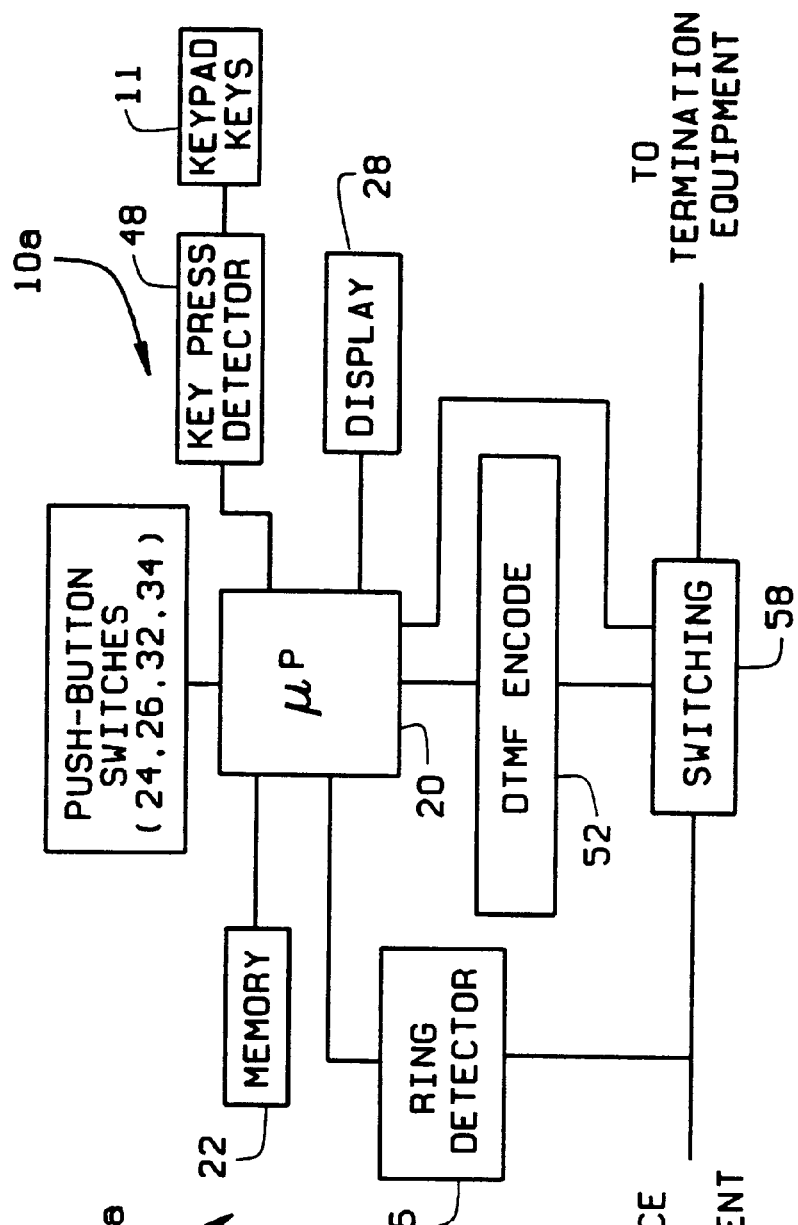
FIG. 5 is a schematic block diagram illustrating the interconnection of electrical components of the present invention internally incorporated into customer premises termination equipment.

Electrical circuitry 18b associated with the externally connected telecommunications system 10b shown in FIG. 4 requires several different components when compared to electrical circuitry 18a associated with the internally connected system 10a shown in FIG. 5 that is installed directly into the termination equipment 14. For example, as discussed below the internal system 10a requires a key press detection circuit that is not present in the external system 10b. Furthermore, the external system 10b requires dual tone multifrequency (DTMF) decoding and encoding circuitry 50, while the internal system 10a requires only DTMF encoding circuitry 52. The following discussion sets forth in detail the circuitry 18a employed in the externally connected system 10b, and describes differences between the external system 10b and internal system 10a when appropriate. As will be apparent to those skilled in the art, the circuitry 18b set forth for the external system 10b can be easily adapted for use in the internal system 10a.

FIG. 4 shows a block diagram of the electrical circuitry 18b associated with the externally connected telecommunications system 10b. Detailed schematic drawings showing the interconnection of circuit component associated with externally connected system are set forth in FIGS. 6A and 6B. As shown in FIG. 2, the external system 10b is electrically connected between the jack 42 associated with the termination equipment 14 and the wall jack 43 via wiring 44. The external device 10b is also connected to an ac power outlet (e.g., 60 Hz outlet) at the customer premises such that the circuitry 18b is powered locally. As mentioned above, it is also possible to include a battery power source (not shown) within the housing, if desired, such that the connection to the ac outlet is not needed.

As discussed above, the electrical circuitry 18b shown in FIG. 4 includes the microprocessor 20 which performs data processing functions including input, processing, storage, output and control functions to accomplish a sequence of operations on data stored in the memory device 22. The microprocessor 20 also performs data processing functions based upon signals received from the telecommunications network, termination equipment 14 and the push-button switches 24, 26, 32, 34 associated with the external system 10b. The microprocessor 20 inputs and retrieves appropriate information from the nonvolatile memory device 22 based upon the keys 11 or push-buttons 24, 26, 32, 34 pressed. In addition, the microprocessor 20 controls the display of information on the display screen 30. As discussed below in greater detail, if area code information or carrier information is requested by the user to initiate a long distance call, the microprocessor retrieves the necessary data from the memory device 22. The microprocessor 20 monitors signals received from the termination equipment 14 indicating whether the termination equipment 14 is in an off-hook or on-hook condition.

The microprocessor 20 also determines whether a ringing signal is transmitted from the network to the termination equipment 14 based upon an output signal generated by a ringing detector circuit 56. The ringing detector circuit 56 monitors signals received from the telecommunications network to determine whether a ringing signal is being transmitted from the network. When a ringing signal is detected, the ringing detector circuit 56 notifies the microprocessor 20. As discussed below, the microprocessor 20 uses this information to control the operation of the system 10b.

As shown in FIG. 4, the microprocessor 20 also controls the operation of a switching circuit 58 that is operatively connected to the termination equipment 14. As discussed below in greater detail, the switching circuit 58 routes and processes signals received from the telecommunications network, termination equipment 14, and the microprocessor 20. More specifically, the microprocessor 20 determines in which of six possible states the switching circuit 58 is maintained. Based upon the state of the switching circuit 58, the user's termination equipment 14 is connected to the telecommunications network or the external system 10b, and the external system 10b is connected to or disconnected from the telecommunications network. The switching circuit 58 allows the system 10b to transmit signals to the telecommunications network when the system 10b is activated to dial and transmit information such as an area code, toll or carrier information. The switching circuit 58 disconnects the system 10b from the telecommunications network when the system 10b is not transmitting signals to the network. The switching circuit further allows the user to hear a dial tone supplied by the telecommunications network when the termination equipment is off-hook.

When no power is supplied to the system 10b from the ac power supply, the switching circuit 58 is in a first state (state 1) representative of a "no power" default state associated with the switching circuit 58. In this state, the external system 10b is effectively bypassed, allowing for signals to pass directly between the telecommunications network and the termination equipment 14. This state occurs because of a no-power default state associated with relays K1 and K2 (i.e., K2:A and K2:B) discussed below and shown in FIG. 6A.

The microprocessor causes the switching circuit 58 to enter the second state (state 2) from state 1 when power is applied to the system 10b, or upon completion of states 4, 5 or 6 (discussed below) and power is applied to the system 10b. In this state, the termination equipment 14 is on-hook and no ringing signal is being transmitted from the telecommunications network. The external system 10b allows for "one way" signal flow from the telecommunications network to the termination equipment 14 in state 2. All signals transmitted from the termination equipment 14 are intercepted and routed through the external system 10b.

In state 2, the system 10b continuously monitors the state of the termination equipment 14 and the communications line to determine whether the termination equipment 14 is off-hook, or a ringing signal is present on the communications line. As will be discussed below in greater detail with respect to FIGS. 6A and 6B, the microprocessor 20 continuously monitors an output signal LINEOH generated by an optoisolator O2 included in the switching circuit 58 as shown in FIG. 6A and discussed below in greater detail. The state of the LINEOH signal indicates whether the termination equipment 14 is in an off-hook state or an on-hook state. When the LINEOH signal indicates the termination equipment 14 is off-hook, the microprocessor 20 causes the switching circuit 58 to enter state 3 (discussed below). If the microprocessor 20 determines, using a $\overline{\text{RING}}$ output signal discussed below with respect to FIGS. 6A and 6B, that a ringing signal is present on the communication line, then the microprocessor 20 causes the switching circuit 58 to enter state 5 (discussed below). If the microprocessor 20 determines that the program push-button switch 34 has been pressed for a length of time such as five seconds, then the microprocessor 20 triggers the switching circuit 58 into state 6 (discussed below).

The microprocessor 20 causes the switching circuit 58 to enter the third state (state 3) when power is supplied to the system 10b from the ac power source, no ringing signal is detected on the communication line, and the termination equipment 14 is in an off-hook condition. In this state, the system 10b allows, through configuration of the switching circuit 58, for "one-way" signal transmission from the telecommunications network to the termination equipment 14. However, signals transmitted by the termination equipment are intercepted and routed through the external system 10b. No signals transmitted from the termination equipment 14 are permitted to pass to the network. In this situation, the user can hear or recognize network signals. The microprocessor 20 continuously monitors output signals generated by the decoding portion of the DTMF circuit 50 (discussed below) to determine whether the user pressed any keys 11 on the keypad 12, and if so, which keys 11 were pressed. The microprocessor 20 also continuously monitors whether the user has pressed the AC buttons 24, the toll free buttons 26 or the carrier button 32a. Depending upon the user's actions, the system 10b responds in a different manner, and then triggers the switching circuit 58 to enter state 4 (discussed below) after it responds.

For the external system 10b only, if the user presses the "*" key on the keypad 12, then the system 10b waits for one or more digit keys 11 on the keypad 12 to be pressed after the "*" key is released, indicating the user is implementing the remote dialing features. As discussed above, based upon the digit key(s) 11 pressed, the system 10b dials either area code information or carrier information stored for the AC push-button 24 or carrier position having the same reference number as the digit(s) pressed. If the next key pressed corresponds to digit "1" through "9", then the microprocessor 20 retrieves the area code information associated with the corresponding AC push-button from the memory device 20, the system 10b transmits a corresponding dial signal to the telecommunications network. If the next digit pressed corresponds to digit "0", then the system waits for two additional keys 11 to be pressed by the user indicating the particular carrier information the user wishes the system 10b to transmit to the telecommunications network. As discussed above, if one of the first ten carriers is selected (i.e., carrier number 1-0), the user presses the "*" key after entering the appropriate digit key. If a carrier is selected that has a two digit carrier number (i.e., carrier number 11-99, or carrier number 11-18 in the preferred embodiment), then the user presses the appropriate two digit keys, and is not required to press the "*" key. After the two keys are pressed, the microprocessor 20 retrieves the appropriate carrier information from the memory device 22, and transmits a representative dial signal to the telecommunications network.

After the dial signal is transmitted to the telecommunications network by the system 10b, the microprocessor 20 triggers the switching circuit 58 into the fourth state as set forth below. If the user presses any key 11 on the keypad 12 other than described above, the microprocessor 20 triggers the switching circuit 58 into the fourth state immediately. If one of the AC buttons 24, toll free buttons 26 or the carrier button 32a is pressed, the microprocessor retrieves the corresponding information stored in the memory device 22, and the system 10b transmits an appropriate dial signal to the telecommunications network. After transmitting the dial signal, the microprocessor 20 causes the switching circuit 58 to enter the fourth state.

For the internal system 10a, no remote dialing features are employed. Therefore, in the internal system 10a, the microprocessor 20 triggers the switching circuit 58 into the fourth state when any key 11 on the keypad 12 is pressed, including the "*" key 36. The switching circuit 58 and microprocessor 20 of the internal system 10a operate in the same manner as discussed above with respect to the external system 10b when one of the AC buttons 24, toll free buttons 26, or carrier button 32a is pressed.

The fourth state (state 4) of the switching circuit 58 is entered from state 3 when the microprocessor 20 determines the termination equipment 14 is still off-hook (using the LINEOH signal), and power is supplied to the system 10. In this state, the switching circuit allows for two way signal transmission to and from the telecommunications network and the termination equipment 14. The microprocessor 20 continuously monitors the LINEOH signal (FIGS. 6A and 6B) to determine if the termination equipment 14 remains off-hook. When the termination equipment 14 is placed in an on-hook condition, the microprocessor causes the switching circuit 58 to exit state 4 and enter state 2.

The microprocessor 20 causes the switching circuit 58 to exit the second state and enter the fifth state (state 5) when the microprocessor 20 determines a ringing signal is present on the communication line (based upon the $\overline{\text{RING}}$ signal discussed below), the termination equipment 14 is on-hook, and power is supplied to the system 10. In this state, the microprocessor 20 causes the switching circuit 58 to operatively connect the communication line to the termination equipment 14 for the duration of the ringing signal. This allows the termination equipment 14 to generate an audible ringing sound while the ringing signal is active or present on the communication line. Based upon the $\overline{\text{RING}}$ signal, if the microprocessor 20 determines the ringing signal is inactive or absent for a period of time longer than two (2) seconds, then the microprocessor 20 causes the switching circuit 58 to enter state 2. If the microprocessor determines the termination equipment is off-hook based upon the LINEOH signal (e.g., an incoming call is answered), then the microprocessor 20 causes the switching circuit to enter state 4.

The sixth state (state 6) of the switching circuit 58 is triggered by the microprocessor 20 when the program key 34 is pressed for a period of time (e.g., 5 seconds), thereby activating the programming mode as discussed above. State 6 is entered from state 2, and is referred to as the programming state. In this state, signals transmitted by the termination equipment 14 when the keys 11 are pressed are processed by the system 10, and not transmitted to the telecommunications network. In the circuit diagram shown in FIGS. 6A and 6B, the switching circuit 58 allows a ringing signal to pass from the telecommunications network to the termination equipment 14 in state 6. Alternatively, the ringing signal can be blocked by the switching circuit by connecting a transistor to the base of the Darlington transistor pair Q2 (discussed below and shown in FIG. 6A) that shorts the base of transistor Q2 to ground.

As shown in FIG. 4, the electrical circuitry 18b of the external system 10b also includes the dual tone multifrequency (DTMF) circuit 50 that performs decoding and encoding functions on signals transmitted between the telecommunications network, termination equipment 14 and the microprocessor 20. As is known in the art, DTMF signaling is an address signaling method for telecommunications service using sixteen (16) pairs of frequencies to represent digits and other characters (e.g., the "#" key and the "*" key). It is most commonly used by termination equipment such as a station set to signal to a network switching system. The DTMF codes are pairs of tones or frequencies, one from a low frequency group and the other from a high frequency group. Each of these frequency groups consists of four voice band frequency tones, no two of which are harmonically related. As discussed below, the DTMF circuit 50 processes data signals received from the microprocessor 20 such that the signals are encoded with the appropriate tones (DTMF codes) for use in the telecommunications network. The DTMF circuit 50 also data processes and decodes signals received from the termination equipment 14 for the remote dialing feature and during programming such that the signals are in a format usable by the microprocessor 20.

The electrical circuitry 18a used for the telecommunications system 10a that is incorporated into the termination equipment 14 operates similarly to the circuitry 18b discussed above for the external system 10b. As shown in FIG. 5, the microprocessor 20, display 28, number memory 22, push-button switches 24, 26, 32, 34, ring detector circuit 56 and switching circuit 58 operate in the internal system 10a as set forth above with respect to the external system 10b. The microprocessor 20 can be a separate component included in the circuitry 18a, or can be the microprocessor 20 used in the termination equipment 14 (e.g., in conventional touch tone telephone sets) that performs various additional functions known in art, such as speed dialing and redial functions. The nonvolatile memory device 22 shown in FIG. 5 can be a separate component added to the termination equipment 14, or can be part of a memory device used to store other information used by the termination equipment's microprocessor, such as information stored for speed dial features. The circuitry components of the internal system 10a are powered by a conventional power supply associated with the termination equipment 14.

Differences between the circuitry associated with the internal system 10a and external system 10b include that the internal system 10a requires only DTMF encoding functions to be performed on signals transmitted from the microprocessor 20 to the telecommunications network (via the switching circuit 58). Decoding functions are not necessary in this embodiment since microprocessor 20 is electrically connected to the keys 11 of the keypad 12 either directly or via the key press detection circuit 48. As is known in the art, the keys 11 associated with conventional keypads 12 are on/off switches that transmit unique signals when pressed. In the internal system 10a, output signals from the keys 11 are not converted to tones, and therefore no decoding of the tones is needed for the signals to be interpreted by the microprocessor 20. The key press detection circuit 60 is connected between the microprocessor 20 and the keys 11 when the on/off switch keys 11 are multiplexed or when the on/off switch keys 11 are not metallic contact switches (e.g., capacitive switches). In these configurations, the key press detection circuit 48 detects and processes the signal generated by a particular key 11, and transmits an output signal to the microprocessor 20 indicating that key 11 was pressed.

Referring now to FIGS. 6A and 6B, the preferred embodiment of the electrical circuitry 18b used in the external system 10b is illustrated. The microprocessor 20 is designated as U3 in FIG. 6B. In the preferred embodiment, the microprocessor 20 is manufactured by Phillips Inc. and sold as model number 87C751. However, any general purpose microprocessor 20 can be used. As shown in the schematics, the microprocessor 20 is operatively connected to the display 28 via a jumper J3, the nonvolatile memory device 22 (designated as U5), and the DTMF circuit 50. As mentioned above, the nonvolatile memory device U5 is preferably a serially accessed electrically erasable programmable read only memory (EEPROM) device having a programmable read only memory in which cells can be erased electrically and in which each cell can be reprogrammed electrically. Furthermore, the microprocessor U3 controls the states of the switching circuit 58.

As shown in FIG. 6B, the DTMF circuit 50 includes an integrated circuit (IC) device U6 which performs encoding functions and decoding functions on data transmitted between the microprocessor and the switching device. Signals transmitted from the microprocessor U3 are processed by the IC device U6. Based upon signals received from the microprocessor U3, the IC device U6 generates a DTMF signal referred to as DTMFOUT in FIGS. 6A and 6B. As shown in FIG. 6A, the DTMFOUT signal is transmitted from the IC device U6 to a communication line via a first resistor R10 and a second resistor R5, a transformer T1, a third resistor R5, a relay switch K2:B, a public network interface circuit 62 (discussed below), and jack J1.

The decoding function of the IC device U6 receives an input signal RECDTMF from the keypad 12 associated with the termination equipment 14 via jack J2, a relay switching device K1, and a capacitor C6. A decoded signal representative of the tones received from the termination equipment 14 is then transmitted from the IC device U6 to the microprocessor U3 for further data processing operations.

The circuitry 18b also includes a power supply circuit 54 shown in FIG. 6B that is connected to the local alternating current (ac) power source as shown in FIG. 2. The power supply 54 includes a jumper J4 which is connected to and receives local ac power from a wall plug mounted transformer (not shown) located at the customer's premises, and then converts the power signal into required regulated and unregulated voltages using a positive temperature coefficient fuse (PTCF) F2, a zener diode VR2, capacitor C14, capacitor C15, a voltage regulator U7, capacitor C16, capacitor C17 and a voltage regulator U8.

The switching circuit set forth in FIG. 6A includes a transistor Q1 for driving relay K1 which, in turn, causes the attached termination equipment 14 to be connected to the telecommunications network or to the external system 10b. The operation of transistor Q1 is controlled by the microprocessor U3. The microprocessor U3 generates a LOCAL output signal that is supplied to relay K1 via transistor Q1 when the operation of the termination equipment 14 is controlled by the system 10b (i.e., the switching circuit 58 is in the second state). Thus, when the LOCAL signal is generated, the relay K1 changes position such that the system 10b controls operation of the termination equipment 14.

The switching circuit 58 also includes the optoisolator O2, a group of diodes D4, D5, D6, D7, and a resistor R19 that determine whether the termination equipment 14 is maintained in an off-hook or on-hook condition. As discussed above, the optoisolator O2 generates the output signal LINEOH having one state indicating the equipment 14 is off-hook, and another state indicating the equipment 14 is on-hook. The LINEOH signal is supplied to microprocessor U3, which uses this information to control the state of the switching circuit 58.

A Darlington transistor pair Q2, resistors R11, R12, and R13, and capacitor C8 are also included in the switching circuit 58. These components allow for transmission of an audible dial tone from the communication line to the termination equipment 14 when it is off-hook and the system 10b is connected to the termination equipment.

The switching circuit 58 also includes a transistor Q3 and a relay switching device K2:A, K2:B which allow the system 10b to transmit signals to the pubic network when the system 10b is activated by the user to transmit area code, toll or carrier information. These components Q3, K2:A, K2:B also allow the system 10b to disconnect from the telecommunications network when the system 10b is deactivated (i.e., no signal transmission from the system 10b to the telecommunications network is required). Energization of a relay coil K2:A, which in turn controls the operation of relay switch K2:B, is controlled by the microprocessor U3. An output signal DRVOH is generated by the microprocessor U3 when the termination equipment 14 goes off-hook. This signal is supplied to the base lead of a transistor Q3 as shown in FIG. 6A. When the DRVOH signal is supplied to the transistor Q3, a signal indicating the off-hook condition of the termination equipment 14 is transmitted to the telecommunications network via resistor R5, transformer T1, relay switch K2:B, the public network interface circuit 62, and jack J1.

The system 10b also includes the ringing detection circuit 56 shown in FIG. 6A having an ring detector integrated circuit U1, an optoisolator O1 and associated passive components, all designated as block 56. As mentioned above, the ringing detection circuit 56 determines whether the termination equipment 14 is ringing, indicating the presence of an incoming call. The optoisolator O1 generates an output signal $\overline{RING}$ that is transmitted to the microprocessor U3, thereby allowing the microprocessor U3 to trigger the switching circuit 58 to connect the termination equipment to the public or private telecommunications network (communication line) for the duration of the ringing signal. The microprocessor U3 determines whether the call has been answered based upon the LINEOH signal discussed above.

Before the signal is transmitted from the system 10b to the telecommunications network, the signal is processed by the public network interface circuit 62 that is connected between the switching circuit 58 and jack J1. The interface circuit 62 is required by the Federal Communications Commission (FCC), Part 68, since the telecommunications system 10b is connected to the public telecommunications network. This interface device 62 provides the necessary protection to the public telecommunications network from line transients that may occur for various reasons. As shown in FIG. 6A, the interface circuit 62 includes jack J1 connected to the conventional wall jack 43 that provides access to the public or private telecommunications network via customer premises equipment (CPE) (not shown). A fuse F1, a metal oxide varistor (surge protector) V1, and a bidirectional transient suppresser (back-to-back zener diodes) VR1 are also included in the interface circuit 62 to protect the telecommunications network from line transients and undesirable signals that otherwise may damage the network.

KEY 1 and KEY 2 shown in FIG. 6B provide connection for the push-button switches 24, 26, 32, 34 to the electrical circuitry 18b. As discussed above, the preferred embodiment of the external system 10b includes nine push-button switches (three area code (AC) switches 24, three switches used to select long distance carriers 32, one program switch 34, and two toll switch 26). The KEYS 1 and 2 are operatively connected to the microprocessor U3 via a parallel-to-serial converter U2 and a bay of resistors R17 as shown in FIG. 6B.

Other electrical components included in the preferred embodiment of the circuitry for the external system 10b include an integrated circuit U4 shown in FIG. 6B which generates a reset signal RST which is used to reset the microprocessor U3.

Numerous variations in the present invention will occur to those skilled in the art. For example, the area code (AC) push-buttons 24 can be programmed to automatically choose a carrier and dial that carrier's access code. After transmitting a dial signal indicating the access code information, the system 10 can be programmed to dial a preprogrammed area code as well. Alternatively, the system 10 can be programmed to only dial the access code and then allow the user to either manually input an area code, or press another AC button to dial the desired area code. The user can change the carrier access code information, if desired, using the programming steps set forth above for programming of the AC buttons. The present invention also allows a user to program information relating to prepaid calling card numbers in the system 10. The calling card information is stored in the memory device 22. This information can be programmed in place of carrier information in a carrier slot, or instead of area code information for an AC button. Thus, the user can trigger the system to dial the prepaid calling card information by selecting the appropriate "carrier" corresponding to the calling card information, or by pressing the appropriate AC button 24. This feature is particularly time saving when placing long distance calls since some prepaid calling cards require a user to dial up to 20 numbers before dialing the desired extension address. Other possible configurations of the system 10 allow the user to dial a telephone number to update the carrier information or obtain information indicating the carrier offering the least expensive rates for a particular type of call. This information could be uploaded into the system 10 automatically by modem transfer. Alternatively, information indicating rates charged by various carriers could be provided by calling a customer service information center (e.g., calling an "800" or "900" telephone number), or by posting such rates on an Internet site. These variations are merely illustrative.

We claim:

1. A telecommunications interface system operably coupled to customer premises termination equipment for controlling signal transmission to a communication network, comprising a memory device for storing data including area code information representative of at least one area code; a data processing system operably connected to said memory device for performing input, processing, storage, output and control functions on data stored in said memory device; at least one area code push button switch operatively connected to said data processing device, the number of area code switches being at least equal to the number of area codes stored in said memory device, each area code switch triggering said data processing device to retrieve information relating to a corresponding area code when actuated, and said data processing device then transmitting a dial signal to the telecommunications network representative of the area code information associated with the actuated area code switch.

2. The telecommunications interface system as set forth in claim 1, further including a visual display device operably connected to said data processing system for displaying information based upon data stored in said memory device.

3. The telecommunications interface system as set forth in claim 2, wherein data representative of a plurality of access codes and a plurality of long distance communication service providers are stored in said memory device, said access codes providing access to a long distance communication service provided by one of the long distance communication providers.

4. The telecommunications interface system as set forth in claim 3, wherein said display device displays data relating to one of said long distance providers stored in said memory device.

5. The telecommunications interface system as set forth in claim 4, further including means for changing data displayed on said display device to show data relating to another long distance provider stored in said memory device.

6. The telecommunications interface system as set forth in claim 5, further including means for selecting a desired long distance communication service based upon presently displayed data on said display device.

7. The telecommunications interface system as set forth in claim 6, further including means for transmitting a dial signal indicating the access code for the selected long distance communication service to the communication network.

8. The telecommunications interface system as set forth in claim 7 wherein said means for changing information displayed on said display device includes a first manually actuated push-button switch and a second manually actuated push-button switch that allow a user to selectively change data displayed on said display device by pressing said first or second switch, said first switch, upon actuation, triggering said data processing system to change data displayed on said display device to data relating to a next long distance provider stored in said memory device following the presently displayed provider, said second switch, upon actuation, triggering said data processing system to change data displayed on said display device to the long distance provider data previously displayed before the presently displayed provider data appeared on said display device.

9. The telecommunications interface system as set forth in claim 8 wherein said means for selecting a desired long distance communication service includes a third manually actuated push-button switch operatively connected to said data processing system that is actuated when the desired long distance provider data appears on said display device, said data processing system retrieving data associated with the selected service when said third push-button switch is pressed, and causing said transmitting means to transmit the dial signal based upon the retrieved data.

10. The telecommunications interface system as set forth in claim 1 wherein said system is disposed in said termination equipment.

11. The telecommunications interface system as set forth in claim 1 wherein said system is disposed inside a housing, said system being electrically connected between said termination equipment and said communication network.

12. The telecommunications interface system as set forth in claim 1 wherein said memory device is an electrically erasable programmable read only memory device.

13. The telecommunications interface system as set forth in claim 1, further including a manually actuated program push-button switch for triggering said data processing system into a programming mode when pressed by a user, and a plurality of manually actuated dial keys on a keypad associated with said termination equipment in electrical communication with said data processing system, said dial keys triggering said data processing system to change data stored in said memory device when pressed by a user during the programming mode.

14. A telecommunications interface system used in conjunction with a touch tone telephone set for controlling signal transmissions between the telephone and a telecommunications network, comprising a memory device for storing data including area code information representative of one or more area codes; a data processing device operably connected to said memory device for performing data processing functions on data stored in said memory device, and for controlling operation of said interface system; one or more manually actuated area code push-button switches operatively connected to said data processing device, the number of area code switches being at least equal to the number of area codes stored in said memory device, each area code switch triggering said data processing device to retrieve information relating to a corresponding area code when actuated, and said data processing device then transmitting a dial signal to the telecommunications network representative of the area code information associated with the actuated switch.

15. The telecommunications interface system as set forth in claim 14, wherein data including name information identifying one or more long distance telecommunications service providers and access code information for accessing a long distance telecommunications service provided by each of said long distance providers are stored in said memory device.

16. The telecommunications interface system as set forth in claim 15, further including a visual display device operably connected to the data processing system for displaying information based on data stored in said memory device.

17. The telecommunications interface system as set forth in claim 16, further including means for changing presently displayed information on said display device to show name information relating to a different long distance provider stored in said memory device.

18. The telecommunications interface system as set forth in claim 17, further including means for selecting a desired long distance communications service based upon presently displayed name information on said display device.

19. The telecommunications interface system as set forth in claim 18, further including a manually actuated carrier push-button switch operatively connected to said data processing device for triggering said data processing device to transmit a dial signal to the telecommunications network representative of the access code for the selected long distance communication service upon actuation of said carrier switch.

20. The telecommunications interface system as set forth in claim 19 wherein said system is disposed in a housing for the telephone set.

21. The telecommunications interface system as set forth in claim 19 wherein said system is disposed in a housing externally connected to the telephone set.

22. The telecommunications interface system as set forth in claim 14, wherein said data processing device monitors signals received from the telephone set indicating whether the telephone set is maintained in an off-hook condition or an on-hook condition.

23. The telecommunications interface system as set forth in claim 22, further including power source for supplying power to said interface system.

24. The telecommunications interface system as set forth in claim 23, further including a ringing detector circuit operatively connected between said data processing device and the telecommunications network for monitoring signals received from the telecommunications network to determine whether a ringing signal indicative of an incoming call is present, and transmitting a message signal to said data processing device indicating when a ringing signal is received.

25. The telecommunications interface system as set forth in claim 24, further including a switching circuit operatively connected to said data processing device, the telecommunications network and the telephone set for routing and processing signals transmitted to and from the telecommunications network and the telephone set, said data processing device controlling the operation of said switching circuit when said interface system is energized by said power source.

26. The telecommunications interface system as set forth in claim 25, further including a dual tone multifrequency circuit operatively connected between said microprocessor and said switching circuit for converting signals transmitted from said microprocessor to the telecommunications network into a format readable by the telecommunications network.

27. The telecommunications interface system as set forth in claim 26 wherein said dual tone multifrequency circuit converts signals transmitted by the telephone into a format readable by said data processing device.

28. The telecommunications interface system as set forth in claim 26, further including a manually actuated program push-button switch operatively connected to said data processing device for triggering said data processing device into a programming mode of operation when pressed for a predefined period of time, said data processing device changing data stored in said memory device when in the programming mode based upon information input by a user by pressing one or more keys on a telephone keypad associated with the telephone set.

29. The telecommunications interface system as set forth in claim 14 wherein the data stored in said memory device includes information relating to one or more toll free codes used to place calls via the telecommunications network free of charge.

30. The telecommunications interface system as set forth in claim 29, further including one or more manually actuated push-button switches operatively connected to said data processing device, the number of said switches corresponding to the number of toll free codes stored in said memory device, each of said switches triggering said data processing device to transmit a dial signal upon actuation to the telecommunications network representative of the toll free code associated with the actuated switch.

31. The telecommunications interface system as set forth in claim 14, 19 or 30, further including a manually actuated program push-button switch operatively connected to said data processing device for triggering said data processing device into a programming mode of operation when pressed for a predefined period of time, said data processing device changing data stored in said memory device when in the programming mode based upon information input by a user by pressing one or more keys on a telephone keypad associated with the telephone set.

32. The telecommunications interface system as set forth in claim 31 wherein said switching circuit is in one of six operational states, including a first operational state allowing for signal transmission between said telephone set and the telecommunications network when said interface system is not energized by said power source, a second operational state occurring when no signals are transmitted to or from said telecommunications network, signals transmitted by said telephone set are data processed by said data processing device, said telephone set is on-hook, and said interface system is energized by said power source, a third operational state allowing for signal transmission from the telecommunications network to said telephone set, the third state occurring when the ringing signal is not detected by the ringing detector circuit, and said telephone set is off-hook, and said interface system is energized by said power source, said interface system controlling signal transmission to the telecommunications network in the third state when the user presses one of the keys on the telephone keypad, area code switches or the carrier switch, a fourth operational state occurring after the third operational state expires when the telephone set is off-hook and said interface system is energized by said power source, said switching circuit allowing for signal transmission between the telecommunications network and said telephone set during the fourth operational state, said data processing device causing said switching circuit to exit the fourth operational state and enter the second operational state when said telephone set returns to the on-hook condition, a fifth operational state occurring after the second operational state expires when a ringing signal is detected by said ringing detector circuit, said telephone set is on-hook, and said interface system is energized by said power source, said switching circuit allowing for signal transmission from the telecommunications network to said telephone set for at least the duration of the ringing signal, said data processing device causing said switching circuit to enter the second operational state after the ringing signal has expired for a predefined period of time, said data processing device causing said switching circuit to enter the fourth operational state if the termination equipment goes off-hook, and a sixth operational state occurring when said data processing device is in the programming mode.

* * * * *